(12) United States Patent  
Auberger et al.

(10) Patent No.: US 9,239,947 B2  
(45) Date of Patent: Jan. 19, 2016

(54) FACE DETECTION METHOD

(75) Inventors: Stéphane Auberger, Noisy-le-Grand (FR); Arnaud Bourge, Paris (FR); Adrien Graton, Brunoy (FR)

(73) Assignee: ST-Ericsson SA, Plan-les-Ouates (CH)

( * ) Notice: Subject to any disclaimer, the term of this patent is extended or adjusted under 35 U.S.C. 154(b) by 235 days.

(21) Appl. No.: 13/997,082

(22) PCT Filed: Dec. 22, 2011

(86) PCT No.: PCT/EP2011/073878  
§ 371 (c)(1),  
(2), (4) Date: Jul. 1, 2013

(87) PCT Pub. No.: WO2012/085246  
PCT Pub. Date: Jun. 28, 2012

(65) Prior Publication Data  
US 2013/0294688 A1  Nov. 7, 2013

Related U.S. Application Data

(60) Provisional application No. 61/440,208, filed on Feb. 7, 2011.

(30) Foreign Application Priority Data

Dec. 24, 2010  (EP) .................................... 10306517

(51) Int. Cl.  
*G06K 9/00* (2006.01)  
*G06K 9/34* (2006.01)  
(Continued)

(52) U.S. Cl.  
CPC ........ *G06K 9/00268* (2013.01); *G06K 9/00234* (2013.01); *G06K 9/4652* (2013.01); *G06T 7/408* (2013.01)

(58) Field of Classification Search  
None  
See application file for complete search history.

(56) References Cited

U.S. PATENT DOCUMENTS 5,644,359 A * 7/1997 Ito .............................. 348/223.1  
6,678,407 B1 * 1/2004 Tajima .......................... 382/167  
(Continued)

FOREIGN PATENT DOCUMENTS

JP  2005242582 A * 9/2005 ................ G06T 1/00  
JP  2007264860 A * 10/2007 ................ G06T 7/00  
(Continued)

OTHER PUBLICATIONS

"Skin detection in video under changing illumination conditions," Maricor Soriano et al, Proceedings of 15th International Conference on Pattern Recognition, 2000, vol. 1 Sep. 3-7, 2000, pp. 839-842.*  
(Continued)

*Primary Examiner* — Wenpeng Chen  
(74) *Attorney, Agent, or Firm* — Coats & Bennett, PLLC

(57) ABSTRACT

A method for detecting faces in an image having a plurality of picture elements, each having a plurality of color components in a predetermined color space, includes determining an extended range for color component values, in the color space, in which a skin tone area is likely to be detected, defining intervals for the color component values, in the color space, covering at least part of the extended range, and scanning each of the intervals to detect a skin tone area. If a skin tone area is detected, the method includes selecting the intervals in which a skin tone area is detected, defining candidate limited ranges for color component values, in the color space, from the selected intervals, performing face detection on a skin tone area in at least some of the candidate limited ranges, and selecting a chosen candidate limited range based on the number of faces detected.

17 Claims, 3 Drawing Sheets

(51) Int. Cl.
*G06K 9/46* (2006.01)
*G06T 7/40* (2006.01)

(56) References Cited

U.S. PATENT DOCUMENTS

| | | | | |
|---|---|---|---|---|
| 8,406,482 | B1* | 3/2013 | Chien et al. | 382/118 |
| 2003/0169348 | A1* | 9/2003 | Ikeda et al. | 348/223.1 |
| 2004/0017938 | A1* | 1/2004 | Cooper et al. | 382/171 |
| 2004/0196383 | A1* | 10/2004 | Suzuki et al. | 348/223.1 |
| 2005/0207643 | A1 | 9/2005 | Lee et al. | |
| 2006/0029265 | A1* | 2/2006 | Kim et al. | 382/118 |
| 2006/0066912 | A1* | 3/2006 | Kagaya | 358/302 |
| 2006/0232684 | A1* | 10/2006 | Miki | 348/223.1 |
| 2007/0058860 | A1* | 3/2007 | Harville et al. | 382/167 |
| 2007/0085911 | A1* | 4/2007 | Nakamura | 348/223.1 |
| 2007/0122034 | A1* | 5/2007 | Maor | 382/181 |
| 2007/0223820 | A1* | 9/2007 | Doi | 382/218 |
| 2009/0002518 | A1* | 1/2009 | Nakamura | 348/223.1 |
| 2009/0002519 | A1* | 1/2009 | Nakamura | 348/223.1 |

FOREIGN PATENT DOCUMENTS

| | | |
|---|---|---|
| JP | 2009302700 A | 12/2009 |
| WO | 2010046082 A1 | 4/2010 |

OTHER PUBLICATIONS

"Research of Self-Adaptive Chroma Space Model Skin-Color Algorithm Based on Illumination and its Application to Erotic Webpage Filtering," Xiaohui Zhao, 2010 International Conference on Networking and Digital Society, 2010, pp. 13-17.*

Cheddad, et al., "A skin tone detection algorithm for an adaptive approach to steganography." Signal Processing, vol. 89, No. 12, Dec. 2009. Elsevier B.V., Amsterdam, Netherlands.

Bevilacqua, et al., "Face detection by means of skin detection." Advanced Intelligent Computing Theories and Applications. With Aspects of Artificial Intelligence. ICIC 2008, LNAI, vol. 5227, pp. 1210-1220. 2008. Springer-Verlag, Berlin, Germany.

Khan, R., et al., "An adaptive multiple model approach for fast content-based skin detection in on-line videos." pp. 89-95. AREA '08, Oct. 31, 2008, Vancouver, B.C, Canada. XP002642248.

Azpiazu, J., et al., "An Adaptive Colour Based Face Detector System for a Social Mobile Robot." Proceedings of the 2nd European Conference on Mobile Robots, 2005. XP002642249.

Fritsch, J., et al., "Improving adaptive skin color segmentation by incorporating results from face detection." Proceedings of the 11th IEEE International Workshop on Robot and Human Interactive Communication. Sep. 25, 2002. pp. 337-343. IEEE, Piscataway, NJ. XP010611667.

Stern, H., et al., "Adaptive color space switching for face tracking in multi-colored lighting environments." Proceedings of the 5th IEEE International Conference on Automatic Face and Gesture Recognition. May 20, 2002. IEEE, Piscataway, NJ. XP010949365.

Harville, M., et al., "Consistent Image-Based Measurement and Classification of Skin Color." Image Processing 2005, IEEE International Conference on. ICIP 2005, vol. 2. Sep. 11, 2005. pp. 374-377. IEEE, Piscataway, NJ. XP010851068.

* cited by examiner

FACE DETECTION METHOD

TECHNICAL FIELD

The present invention generally relates to devices and methods for face detection in images. It finds application, in particular, in mobile devices such as mobile phones.

By "images", it is meant pictures in electronic form, for example video frames, photos, and any other types of pictures, typically (but not necessarily) digitally encoded, wherein any picture element is defined by colour component values in a given colour space. For two-dimensional pictures, a picture element is typically called a "pixel", whereas the term "voxel" is sometimes used for designating a picture element of a three-dimensional picture. The present invention encompasses both types of pictures.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Face detection has been a subject of research and development for the past twenty years. Many approaches have been developed in order to obtain real-time robust face detection.

Document JP2005 242582 describes a face detection method and device for face detection capable of automatically building a flesh colour model.

The document entitled "An adaptive Multiple Model Approach for Fast Content-Based Skin detection in On-Line Videos", by Khan, Stottinger and Kampel, proposes a method of skin detection in on-line video that uses a static skin colour model.

In the case of mobile phones, the solutions typically still require the use of either dedicated hardware or strong Central Processing Unit (CPU) capabilities, which may typically be found only on high-end feature phones or smart phones.

There is a need for face detection algorithms requiring a low CPU capability and without dedicated hardware, and, thus, being applicable on a low-cost mobile platform. Such algorithms may be based on skin tone detection, using the chromatic composition of images to perform a real-time face detection.

Embodiments of the invention, however, are also applicable in devices other than low-cost mobile devices, e.g. medium or high cost, cameras, non-mobile devices, etc.

SUMMARY

To address the above needs, a first aspect of the present invention relates to a method of defining a skin tone in an image for face detection comprising a plurality of picture elements, each picture element having a plurality of colour components in a predetermined colour space, the method comprising:
- determining an extended range for colour component values, in the colour space, in which a skin tone area is likely to be detected;
- defining a plurality of intervals for the colour component values, in the colour space, covering at least part of the extended range;
- scanning each of the plurality of intervals to detect a skin tone area;

and,
if at least one skin tone area is detected in at least one interval,
- selecting at least some of the intervals in which at least one skin tone area is detected;
- defining candidate limited ranges for colour component values, in the colour space, from the selected intervals;
- performing a face detection on at least one skin tone area in at least some of the candidate limited ranges, and selecting a chosen candidate limited range based on the number of faces detected during said face detection, wherein the chosen candidate limited range is the selected interval leading to the maximum number of detected faces.

Thus, this leads to the largest number of faces to be detected in the image.

In some embodiments, the step of choosing a candidate limited range for colour component values, in the colour space, from the selected intervals is actually explicitly performed simultaneously as the step of selecting at least some of the intervals in which at least one skin tone area is detected. In some of these embodiments, the selected interval directly defines the candidate limited range for colour component values.

For example, the intervals may be defined by a series of interval specific minimum and maximum colour component values.

The scanning of the series of intervals may, for example, be done successively or in parallel.

With the method according to some embodiments of the present invention, it may be possible to set dynamically the extended range in the considered colour space (e.g. adapted to a given image).

In some embodiments of the present invention, the scanning step is carried out along one axis of the colour space.

This feature may enable to limit the computational complexity of the method for face detection.

For instance, the colour space is the $C_b$ $C_r$ space and the scanning step may be carried out along the $C_r$ axis or along the $C_b$ axis.

The $C_r$ axis seems in fact more suitable than the $C_b$ axis in some embodiments of the invention because red is the dominant component in the $C_r$ axis and faces are closer to red than blue.

The step of choosing at least some of the intervals in which at least one skin tone areas is detected may be based on the colour component values of the selected at least one interval In some embodiments some of the intervals in which at least one skin tone area is detected may not be selected, i.e., they can be rejected at the step of selecting, based on the shape of the detected skin tone area. For instance, those with unusual shape are rejected. Thus, not all candidate skin tone areas are submitted to the face detection algorithm.

In some embodiments, the width of each interval and the distance between consecutive intervals are fixed. This choice may provide satisfactory results.

Determining an extended range for colour component values, in the colour space, in which a skin tone area is likely to be detected may permit to obtain a reliable limited range for the face detection by solving the issue of partial or no coverage of a face encountered with the use of a static range. This limits non-detection of faces.

Using relatively small candidate intervals within the relatively large extended range, may permit to limit the number of false detections by solving the issue of skin mask containing face and background encountered with the use of a static range.

The final candidate limited range which is eventually chosen is selected based on face locations detected during the face detection step. For instance, the final chosen candidate limited range is selected after all candidate skin tone area of all candidate limited ranges have been checked by the face detector unit. The results of this chosen limited range will be selected as the chosen face locations provided by the face detector.

If there are at least two intervals leading to the same maximum number of detected faces, the chosen limited range may be the interval further leading to the lowest number of skin picture elements in the image.

Preferably, the dominant criterion is the number of detected faces. In case of equality between two intervals, the one with the less detected skin picture elements may be chosen.

Another additional or alternative criterion for choosing the limited range is to choose an interval located in or close to the middle of a plurality of intervals containing detected faces.

In some embodiments, indeed, if at least two faces have been detected in at least two discontinuous, i.e. non consecutive intervals and at different spatial locations, the steps of choosing a candidate limited range and performing a face detection in the chosen candidate limited range may be carried out independently for each of the two detected skin tone areas.

This choice may be suited to enable the detection of a plurality of faces in a frame when different intervals for the colour component values are suited to detect each of the faces.

A second aspect of the present invention relates to a method for defining a skin tone for in a video signal comprising a plurality of images, each image comprising a plurality of pixels, each pixel having a plurality of colour components in a predetermined colour space, the method comprising:
  a) during a first phase, performing the steps of the method for face detection of the first aspect of the invention for at least one first image;
  b) during a second phase, for at least some of the following images in the sequence, performing a face detection in the same candidate limited range as the candidate limited skin range which has been chosen at step a) for the first image.

With this method, it is possible to set dynamically the range of the skin tone component values adapted to a given video sequence.

In a number of first frames corresponding to the first phase, called also the locking period, an extended wide range in the colour space may be covered by successive small intervals. These intervals may typically (but not necessarily) be smaller than the static range used in the prior art. The result of the face detection within each interval may be analyzed and when the extended range defined at the beginning of the process has been covered or when a stopping criterion is reached, a suitable interval (e.g. the best suitable interval, if any) may be chosen and used to perform the face detection for the remainder of the frames/images in the sequence.

This process relies on a robust Facial Features Detection (FFD) method to validate the explored intervals, and on the assumption that the images used for each interval are quite similar.

In one embodiment, the first phase is stopped if at least one face is detected in a given number of consecutive images, e.g. three consecutive images, of the sequence.

This feature may allow faster face detection and may permit to reduce display latency in the obvious cases in which a face is detected in several consecutive images during the locking period.

In one embodiment, the first phase of the method according to the second aspect of the invention is performed on successive images in the sequence. This choice is well adapted to have a fast low cost processing.

In an alternate embodiment, the first phase of the method according to the second aspect of the invention is performed on a single image.

This choice, which may lead to better results in non-obvious cases, may require more computational capacities.

In one embodiment of the method, if no face is detected during a second number of consecutive images, for each of the following images, the step of face detection is performed in a second candidate limited range located around the originally chosen candidate limited range and if still no face is detected in this second range, then steps a) and b) are repeated.

For instance, if no face is detected and tracked during a certain number of images, for example 15, the steps of the method are re-activated. In some embodiments, the re-activation comprises first using a small range around the previously determined interval, then (if no face can still be detected) using the same parameters as for its initialization.

A third aspect of the present invention relates to a computer program product comprising one or more stored sequences of instructions that are accessible to a processor and which, when executed by the processor, cause the processor to carry out the steps of the methods of the first and of the second aspects of the present invention.

A fourth aspect of the present invention relates to a device for defining a skin tone comprising means for performing the steps of the methods of the first and the second aspects of the present invention.

The device comprises:
  a skin tone detector configured to:
    determine an extended range of colour component values, in the colour space, in which a skin tone area is likely to be detected;
    define a plurality of intervals of colour component values, in the colour space, covering at least part of the extended range;
    scan at least some of the plurality of intervals to detect a skin tone area;
  and,
  a facial feature detector configured to:
  if at least one skin tone area is detected in at least one interval,
    select at least some of the intervals in which at least one skin tone area is detected;
    define candidate limited ranges of colour component values in the colour space, from the selected intervals;
    perform a face detection on at least one skin tone area in at least some of the candidate limited ranges, and select a chosen candidate limited range based on the number of faces detected during said face detection, wherein the chosen candidate limited range is the selected interval leading to the maximum number of detected faces.

A fifth aspect of the present invention relates to a portable electronic apparatus comprising a device according to the fourth aspect of the present invention.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF EMBODIMENTS

Figure 1:
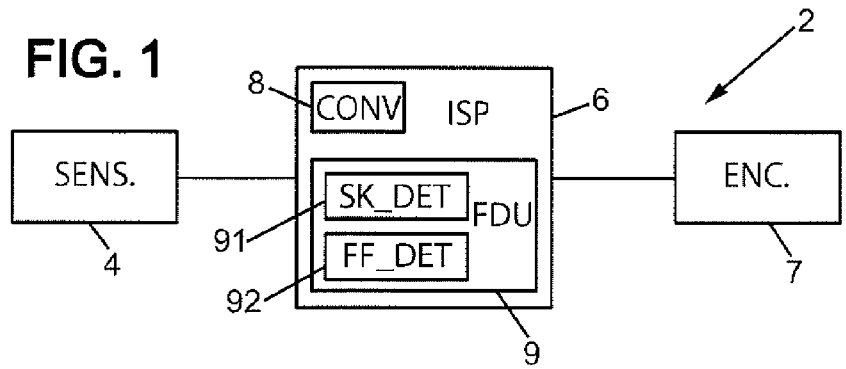
FIG. 1 is a schematic view of a face detection device according to some embodiments of the present invention.

Faces are in general characterized by their chromatic homogeneity and the strong edges around the facial features such as the eyes and the mouth.

Areas of a frame containing skin tones are detected in a Skin Detection (SD) step, and then may be processed in a Facial Feature Detection (FFD) step. Skin tones may be defined as chromatic compositions of typical human skin. FFD is aimed at checking whether the extracted skin areas resulting form the skin detection step indeed contain faces or not, usually by searching for facial features such as eyes and mouth.

One of the main functions of typical Face Detection algorithms is ability to handle dynamic settings and corrections during the recording/acquisition of a video or a picture such as an Auto-White Balance (AWB), an Auto-Focus (AF), and/or an Auto Exposure (AE).

This means that the face detection methods allow detection of faces even if the focus is not perfect, if the exposure is not optimal, and/or if the Auto White Balance is not correct. Once a face is detected, the Auto White Balance can be corrected so that the skin appears more natural.

This functionality is problematic for face detection methods based on skin tone detection. Indeed, skin tone detection is a primordial step of these methods, and it is based on colour detection of the skin pixels. Typically, the colour can change a lot under various auto white balances. Consequently, skin tone detection is complicated in such situations.

In the Skin Detection step, the differentiation between skin pixels and non-skin pixels may be based on the chromatic and/or luminance properties of each pixel of the frame.

Each pixel of the frame typically has a plurality of colour components in a predetermined colour space. For example, in the $YC_bC_r$ space, the properties of a given pixel are distinguished between the luminance (Y space) and the chrominance, described by two axes, $C_b$ and $C_r$. The axes $C_b$ and $C_r$ are encoded 8 bits-value of the UV channels which are widely spread in video processing and/or coding. U and V are the chromatic components of analogical YUV signals and they are defined by a Voltage from −0.5 V to 0.5 V.

In many solutions, the skin-like pixels are statically defined by a range in the $(C_bC_r)$ space: [0,128]×[127,176] for example. Such specific ranges are developed based on experience. One may rely on the physiological fact that the blood flooding under the skin gives it its chromaticity, the type of skin (dependent on the melanin concentration) just influences its luminance. Assuming that everybody has the same colour of blood, thresholds set in the chromatic space may be suited to any kind of skin, as required in specifications.

This kind of static $C_bC_r$ range is typically suited for most images that are correctly balanced and well lighted, independently of the skin colour of included faces.

However, there are many cases where static thresholds result in unsatisfactory skin masks since they are not adapted to the particular conditions. For instance, in some cases, the skin mask containing the face also contains background and other objects. In other cases, the face is not fully covered, or not covered at all, by the skin mask.

Referring to FIG. 1, there is shown therein a schematic view of a device 2 for face detection according to some embodiments of the present invention.

The device 2 may comprise a light sensor 4. The sensor 4 generally senses light which, when coded e.g. in the (R, G, B) colour space, defines an electronic image. Instead of, or in addition to the light sensor, at least one other image source (e.g. other image capturing device or a memory where an image is stored, or an image input port where an image signal is fed from another device, etc), may provide the light pixels. In the following description, we will consider embodiments wherein light pixels are sensed by a light sensor. However, some features that will be described below may not be needed in some other embodiments, e.g. if an image is already captured or stored in an appropriate color space.

The device 2 also comprises an Image Signal Processor, ISP, 6 which processes the sensed light to provide image data to an encoder 7 which encodes these data for a further display, for example.

The Image Signal Processor 6 may comprise a converter 8 which converts the detected light pixels from the (R,G,B) colour space to the (Y,U,V) colour space. As will be understood by the one with ordinary skills in the art, however, such a converter may not be needed in some embodiments, e.g. if an image has already been captured or stored in an appropriate color space.

The Image Signal Processor 6 may also comprise a face detection unit (FDU) 9 that comprises a skin tone detector (SK-DET) 91 and a facial features detector (FF-DET) 92. The operation of these elements will now be explained in further detail below, with reference to the flow chart of FIG. 2.

The Image Signal Processor 6 may also allow dynamic settings and corrections during the recording or acquisition of a video or a picture such as an auto-white balance (AWB), an auto-focus (AF) and an auto-exposure (AE). These three settings and corrections are commonly named "the 3A". One of the goals of the face detection unit 9 is to properly drive the dynamic setting of these "3A" with respect to the faces locations.

Figure 2:
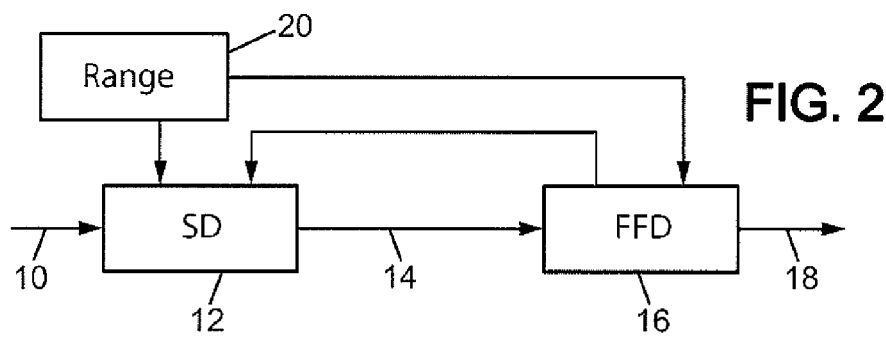
FIG. 2 is a schematic block diagram illustrating steps of a method of face detection according to some embodiments of the present invention.

FIG. 2 illustrates the steps of face detection in a frame 10 according to some embodiments of the present invention.

The first step carried out on the frame 10 is a skin detection (SD) step 12 that extracts skin tones areas 14, i.e., groups of different adjacent, namely contiguous skin pixels contained in the image 10. This skin detection step 12 may be carried out by the skin tone detector 91 of FIG. 1.

The skin tones areas 14 are then processed in a Facial Feature Detection (FFD) step 16 in which it is checked whether the extracted skin tones areas actually contain faces or not, usually by searching for facial features such as eyes and mouth. This step may be carried out by the facial features detector 92 of FIG. 1. The resulting detected face(s) 18 is (are) output for further processing.

Advantageously, the step of skin detection 12 is carried out in an original, extended range of colour component values of a predetermined colour space, set dynamically to be adapted to a given image or to a given video sequence comprising a plurality of images. This step 20 of dynamically setting the extended range of colour component values is schematically represented by a feedback path 20 from the box illustrating step 16 to the box illustrating step 12 in FIG. 2. Indeed, the dynamic setting may be based on the following looped process.

When an interval of pixels of an image is scanned, a number of pixels are identified as possible skin pixels. These pixels are then forwarded to the face detection unit 92 where, based on detection (or absence of detection) of facial features, the pixels are confirmed as being skin pixels (or discarded, respectively). The result is fed back to a selection unit which selects the chosen limited range of the colour component values based on the number of detected faces and possibly the number of primarily identified pixels. The chosen limited range for the colour component values which is selected may advantageously be the interval leading to the maximum number of detected faces among the skin tones areas. Stated otherwise, the criterion used for the selection of the limited range for the colour component values is the maximization of the number of detected faces, namely skin tones areas confirmed to correspond to a human face. Thus, this leads to the largest number of actual faces to be detected in the image.

In the following description, it shall the considered by way of example that the predetermined colour space is the $C_b C_r$ space. However, any other colour space may be used for implementing the methods of the present invention.

Figure 3:
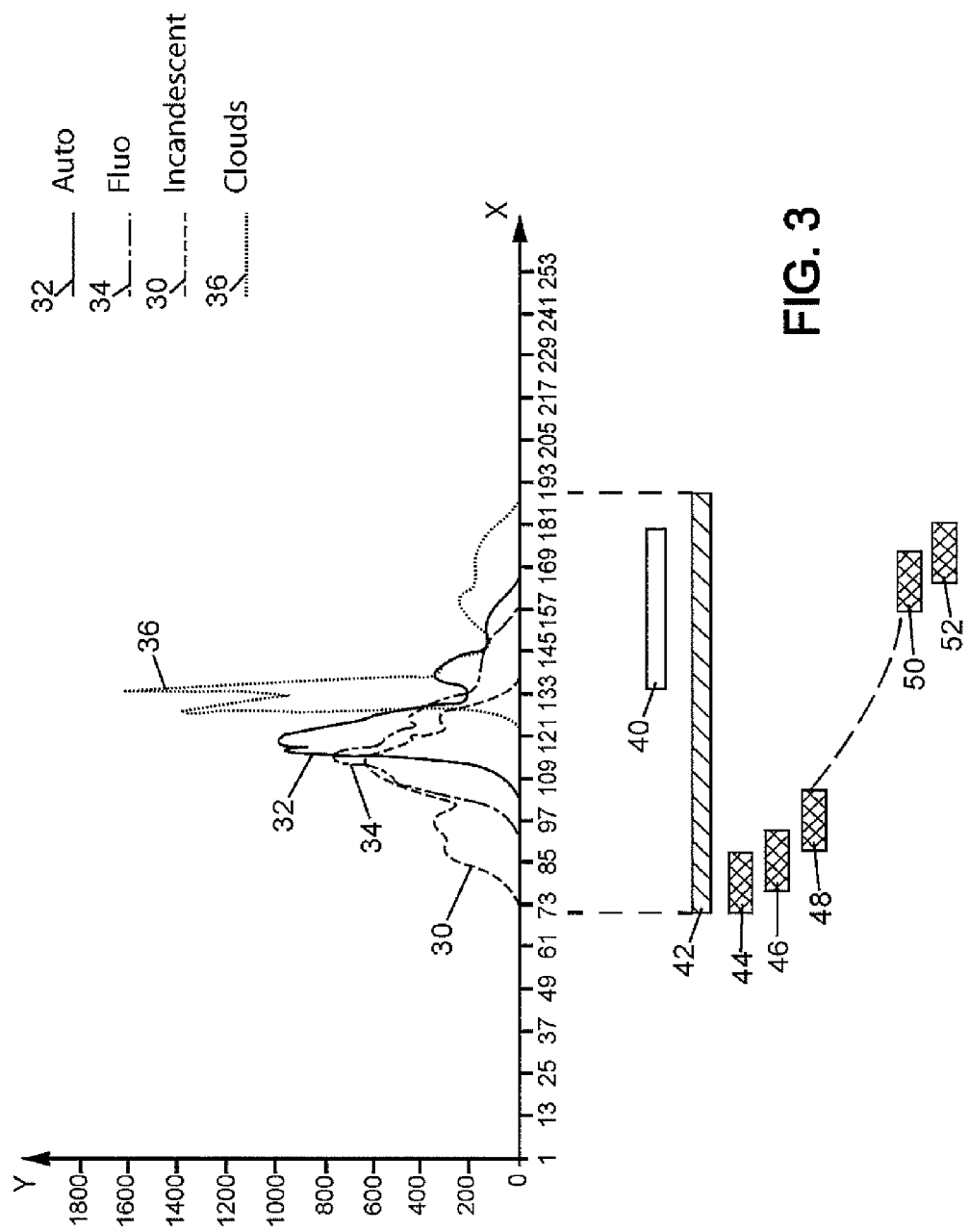
FIG. 3 is a schematic graph illustrating parameters of some embodiments of the present invention.

FIG. 3 is a schematic graph illustrating the step 20 of choosing the dynamic range according to some embodiments of the invention.

The graphic of FIG. 3 has two axes X and Y. The X axis gives the values of the $C_r$ component (ranging for instance between 0 and 255 if the component values are 8-bit encoded values), and the Y axis gives the number of pixels having the colour component value defined by the corresponding position on the X axis.

Four curves 30, 32, 34 and 36 are represented. They correspond to the same video sequence, for four respective white balances.

For instance, the curve 30 corresponds to an incandescent white balance, whereas the curve 32 corresponds to an automatic white balance (AWB), the curve 34 corresponds to a fluorescent white balance and the curve 36 corresponds to a cloudy white balance.

Known skin detection methods use a static range 40 of colour component values in the two dimensional $C_b C_r$ space to carry out the skin detection. This static range 40 may be defined as [0,128]×[127, 176] in the $C_b C_r$ space, for instance.

Figure 4:
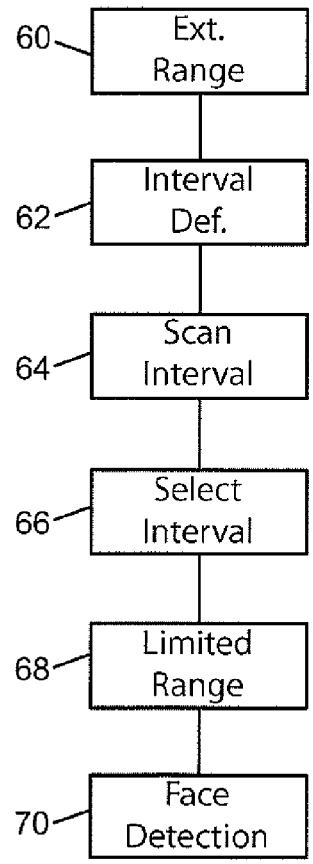
FIG. 4 is a flow chart illustrating steps of a method of face detection according to some embodiments of the first aspect of the present invention.

In contrast, preferred embodiments of the invention provide a dynamic setting, at least for one of the axes $C_b$ and $C_r$, of the extended range of colour component values in which the skin detection is carried out. This extended range may be dynamically determined according to the steps of the flow chart of FIG. 4.

At step 60, an extended range 42 is dynamically determined, for instance, from the graphic of FIG. 3, in which skin tone pixels are likely to be detected. The actual scanning of the image leading to the selection of skin pixels is thus limited to the extended range of colour component values so determined.

The scanning process with dynamic range selection may be performed along the $C_r$ axis only. However, this choice may be fully reversed, i.e., a static range may be used for scanning the image along the $C_r$ axis while a scanning process with dynamic range selection may be done along the $C_b$ axis. Similarly, the scanning process with dynamic range selection can be done along both the $C_b$ and $C_r$ axes at the same time.

As already mentioned above, any other colour space may also be used, such as (U,V) or (R, G, B) or (H, S, V), etc.

The extended range 42 is defined by its starting and stopping points in the $C_r$ axis.

In the example of FIG. 3, pixels appear only for values of $C_r$ which are higher than 70 and lower than 190. Thus, the starting point is chosen equal to 70 and the stopping point is chosen equal to 190.

Consequently, the skin detection is carried out in an extended range 42 greater than the static range 40 of the prior art. This feature may enable to avoid the case of partial or no coverage of a face by the skin mask.

At step 62, a plurality of intervals 44, 46, 48, 50, 52 of colour component values are defined such as to cover the extended range 42. The one with ordinary skills in the art shall identify that intervals may be overlapping or not, may cover the entire range or not, etc. The invention is in no way limited by the number and configuration of the intervals.

Advantageously, the width of each interval and the distance or increment between two consecutive intervals, have fixed values.

The use of a value equal to 20 for the width of the interval and of a value equal to 2 for the increment provides satisfactory results.

At step 64, each of the plurality of intervals 44, 46, 48, 50, 52 is scanned to detect a skin tone area, in a so-called "sliding window" manner.

Thus, the extended range 42 covered by all the individual sliding windows allows to cover a wider range of the $C_r$ spectrum than with the limited static range 40 (e.g. [127-176]) of the prior art, thus coping with situations in which a fixed range may prove to be not large enough. But, at the same time, the use of smaller $C_r$ intervals [44, 46, 48, 50, 52] allows to naturally make faces distinguishable from the background of the image, in cases where the larger static range tends to encompass both faces and other objects.

Then, each skin tone area of each skin tone interval (corresponding to the candidates limited ranges) are checked for faces by the Face Detector Unit.

If at least one skin tone is detected in at least one interval, then the intervals in which at least one skin tone is detected may be selected at step 66.

At step 68, a chosen limited range for component values, along the $C_r$ axis, is chosen from the selected intervals. For example, the chosen limited range may be chosen on the basis of a selection criterion that determines among all the tested intervals the best suitable interval along the $C_r$ axis to perform the face detection.

The choice of selection criterion may be determinant to retain the final skin interval. A bad choice at this stage of the method could lead to false detections or to a considerable latency in the detection of the present faces.

The selection criterion may be the number of detected faces within the skin tone areas. Thus, the chosen limited range is the interval of colour component values leading to the maximum number of detected faces within the skin tone areas.

In some embodiments, a second, namely additional selection criterion may be used for the cases where at least two intervals lead to the same maximum number of detected skin tones.

For instance, the chosen limited range may be the interval further leading to the lowest number of skin pixels in the image. This criterion may enable to avoid false detections. The chosen limited range may not correspond exactly to one selected interval but may correspond to an interval of the $C_r$ axis located between two or more consecutive intervals containing skin tone areas.

In some variants, the chosen limited range may be one interval or several intervals (which may or may not be contiguous, or successive, along the axis), parts of one or more intervals, etc.

Then, face detection is performed at step 70 on at least one skin tone area in at least some of the chosen candidate limited ranges. One candidate limited range is then chosen. This chosen candidate limited range is selected based on face locations detected during the face detection step. For instance, the final chosen candidate limited range is selected after all candidate skin tone area of all candidate limited ranges have been checked by the face detector unit. The results of this chosen limited range will be selected as the chosen face locations provided by the face detector.

To allow faster detection, for instance on the basis of histogram values (as shown in FIG. 3), intervals leading to either too much or too little skin pixels may be discarded. For example, only the intervals leading to a number of skin pixels comprised between 1/64 of the image size and 2/3 of the image size may be considered.

Within a sequence of video images, the above process may be carried out for one image of the sequence, typically the initial image of the sequence considered. Then, face detection may be performed for the following images of the video sequence on at least one skin tone area in the same candidate limited range as the one which has been chosen for the initial image.

Within an image or a video sequence containing several faces, faces can belong to different chromatic domains because they have different skin colour, or because they have different illumination due to the presence of shadow or because they are lighted by different light sources which affect their colour. This may, for example, be solved by use of the following procedure.

If at least two faces have been detected in at least two non-successive intervals and at different spatial locations, the step 68 of selecting a limited range of colour component values and the step 70 of performing a face detection in the chosen limited range of values may be carried out for each detected skin tone area independently of the other, so that all the faces can be efficiently detected.

Figure 5:
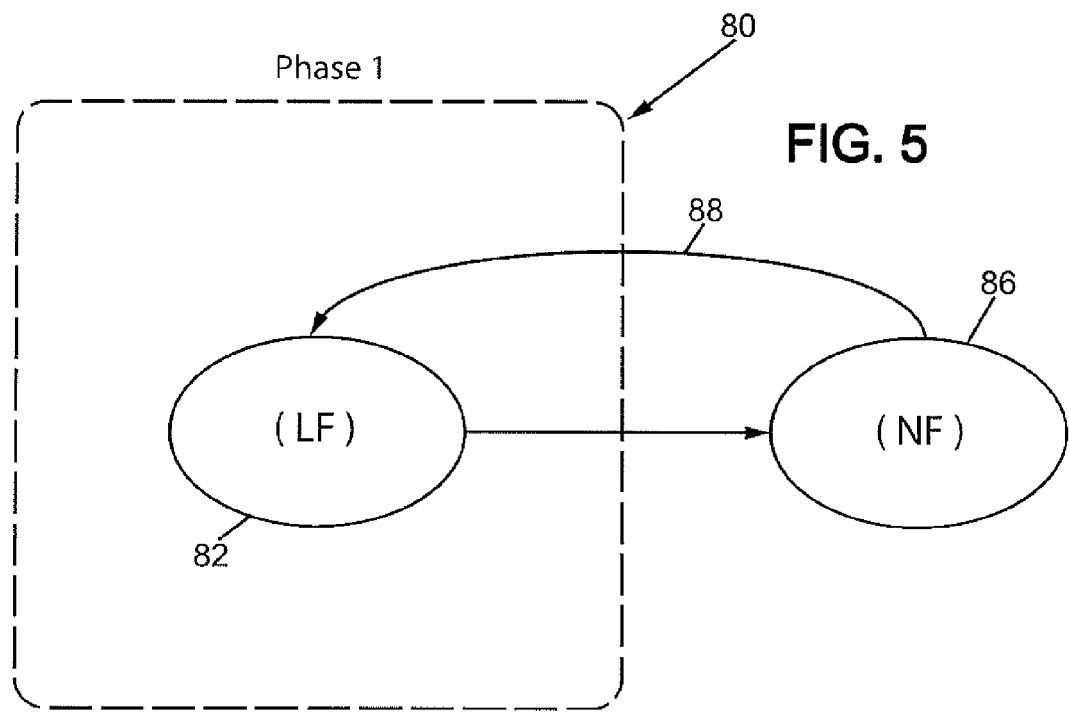
FIG. 5 is a flow chart illustrating steps of a method of face detection according to some embodiments of the second aspect of the present invention.

FIG. 5 illustrates the steps of the method of face detection in a video sequence comprising a plurality of images, by way of a virtual state machine.

During a first phase 80, also called the locking period, the above described face detection scheme is performed on one or more locking images. This corresponds to the depicted state 82 in the figure.

In one embodiment, the locking images comprise a single image which is processed as described above.

In another embodiment, more suited for low cost processing, the locking images comprise a plurality of successive images.

When a first range is found during the looking period, the face detection is performed for each of the following images, called normal images, in this first range. This corresponds to the depicted state 86 in the figure.

If, for example, at least one face is detected in a given number of consecutive frames, for instance three, then the first phase may be stopped.

According to some embodiments, If no face is detected in a certain number of consecutive images processed in state 86, for example 15 consecutive frames, the face detection is performed in a second range of colour component values located around the chosen first range If, even in this second range, no face is detected, then the method enters a reboot 88 and returns to the first phase 80.

This is not the only way to handle the situation wherein no face is detected. In other embodiments, indeed, a reboot 88 of the underlying algorithm may be entered directly after a number of consecutive images with no face have been detected in the first range of colour component values.

In some embodiments, when the system is rebooted, the process is carried out again in a different colour space. This may provide better results than in the original colour space.

Figure 6:
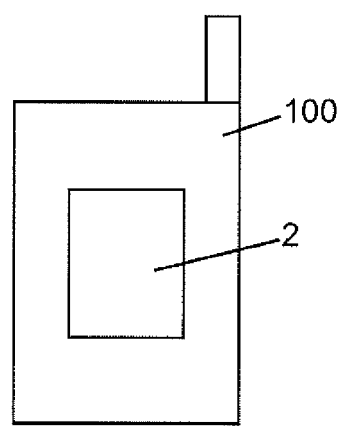
FIG. 6 is a schematic view of an embodiment of a mobile phone.

FIG. 6 illustrates a portable electronic apparatus, for example a mobile phone 100 comprising a device 2 as described above with reference to FIG. 1. It can also be any other communicating mobile terminal, a hand-held computer, a personal digital assistant (PDA), a digital camera or digital video camera, etc.

The present invention can also be embedded in a computer program product, which comprises all the features enabling the implementation of the methods described herein, and which—when loaded in an information processing system -causes the information processing system to carry out these methods. Computer program means or computer program in the present context mean any expression, in any language, code or notation, of a set of instructions intended to cause a system having an information processing capability to perform a particular function .Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A method of defining a skin tone in an image for face detection, the image comprising a plurality of pictures elements, each picture element having a plurality of colour components in a predetermined colour space, the method comprising:
   determining an extended range of colour component values, in the predetermined colour space, in which a skin tone area is likely to be detected;
   defining a plurality of intervals of colour component values, in the predetermined colour space, covering at least part of the extended range;
   scanning each of the plurality of intervals to detect a skin tone area; and
   if at least one skin tone area is detected in at least one interval:
      selecting at least some of the intervals in which at least one skin tone area is detected;
      choosing candidate limited ranges of colour component values in the colour space from the selected intervals;
      performing a face detection on at least one skin tone area in one or more of the chosen candidate limited ranges; and
      selecting a chosen candidate limited range based on numbers of faces detected during the face detection, wherein the chosen candidate limited range has the maximum number of detected faces.

2. The method of claim 1 wherein the scanning each of the plurality of intervals to detect a skin tone area is performed along one axis of the predetermined colour space.

3. The method of claim 2 wherein the predetermined colour space is the $C_b C_r$ space and wherein the scanning each of the plurality of intervals to detect a skin tone area is performed along one of the $C_r$ axis and the $C_b$ axis.

4. The method of claim 1 wherein, if there are at least two chosen candidate limited ranges having the same maximum number of detected faces among the skin tone areas, the selected chosen candidate limited range has a lowest number of skin tone picture elements in the image.

5. The method of claim 1 wherein, if at least two faces have been detected in at least two discontinuous intervals and at different spatial coordinates in two detected skin tone areas, then the selecting a chosen candidate limited range and the performing face detection are performed independently for each of the two detected skin tone areas.

6. The method of claim 1 wherein the selecting at least some of the intervals in which at least one skin tone area is detected comprises rejecting one or more of the intervals in which at least one skin tone area is detected based on a shape of the detected skin tone area.

7. A method of face detection in a video sequence comprising a plurality of images, each image comprising a plurality of picture elements, each picture element having a plurality of colour components in a predetermined colour space, the method comprising:
   in a first phase, for at least one first image:
      determining an extended range of colour component values, in the predetermined colour space, in which a skin tone area is likely to be detected;
      defining a plurality of intervals of colour component values, in the predetermined colour space, covering at least part of the extended range;
      scanning each of the plurality of intervals to detect a skin tone area; and
      if at least one skin tone area is detected in at least one interval:
         selecting at least some of the intervals in which at least one skin tone area is detected;
         choosing candidate limited ranges of colour component values in the colour space from the selected intervals;
         performing a face detection on at least one skin tone area in one or more of the chosen candidate limited ranges; and
         selecting a chosen candidate limited range based on numbers of faces detected during the face detection, wherein the chosen candidate limited range has the maximum number of detected faces among the chosen candidate limited ranges; and
   in a second phase:
      for one or more of the images in the sequence, performing a face detection in the same candidate limited range as the chosen candidate limited range for the at least one first image.

8. The method of claim 7 wherein the first phase is stopped if at least one face is detected in a given number of consecutive images.

9. The method of claim 7 wherein, if no face is detected in a given number of consecutive images of the sequence of images:
   repeating the first phase in a second range of colour component values located around the chosen candidate limited range; and
   repeating the first and second phases if no face is detected in the second range of colour component values located around the chosen candidate limited range.

10. The method of claim 9 wherein if no face is detected in the second range or when the first and second phases are repeated, the method further comprises repeating the first and second phases in a different colour space.

11. A computer program product comprising a non-transitory computer readable medium having stored thereon one or more stored sequences of instructions that are loadable into a processor and which, when executed by the processor, cause the processor to:
   determine an extended range of colour component values, in a predetermined colour space, in which a skin tone area is likely to be detected;
   define a plurality of intervals of colour component values, in the predetermined colour space, covering at least part of the extended range;
   scan each of the plurality of intervals to detect a skin tone area; and
   if at least one skin tone area is detected in at least one interval:
      select at least some of the intervals in which at least one skin tone area is detected;
      choose candidate limited ranges of colour component values in the colour space from the selected intervals;
      perform a face detection on at least one skin tone area in one or more of the chosen candidate limited ranges; and
      select a chosen candidate limited range based on numbers of faces detected during the face detection, wherein the chosen candidate limited range has the maximum number of detected faces among the chosen candidate limited ranges.

12. A computer program product comprising a non-transitory computer readable medium having stored thereon one or more stored sequences of instructions that are loadable into a processor and which, when executed by the processor, cause the processor to:

in a first phase, for at least one first image:
  determining an extended range of colour component values, in the predetermined colour space, in which a skin tone area is likely to be detected;
  defining a plurality of intervals of colour component values, in the predetermined colour space, covering at least part of the extended range;
  scanning each of the plurality of intervals to detect a skin tone area; and
  if at least one skin tone area is detected in at least one interval:
    selecting at least some of the intervals in which at least one skin tone area is detected;
    choosing candidate limited ranges of colour component values in the colour space from the selected intervals;
    performing a face detection on at least one skin tone area in one or more of the chosen candidate limited ranges; and
    selecting a chosen candidate limited range based on numbers of faces detected during the face detection, wherein the chosen candidate limited range has the maximum number of detected faces among the chosen candidate limited ranges; and
in a second phase:
  for one or more of the images in the sequence, performing a face detection in the same candidate limited range as the chosen candidate limited range for the at least one first image.

13. A device for defining a skin tone in an image for face detection, the image comprising a plurality of picture elements, and each picture element having a plurality of colour components in a predetermined colour space, the device comprising:
  a skin tone detector configured to:
    determine an extended range of colour component values, in the colour space, in which a skin tone area is likely to be detected;
    define a plurality of intervals of colour component values, in the colour space, covering at least part of the extended range;
    scan at least some of the plurality of intervals to detect a skin tone area; and,
  a facial feature detector configured to:
    if at least one skin tone area is detected in at least one interval:
      select at least some of the intervals in which at least one skin tone area is detected;
      define candidate limited ranges of colour component values in the colour space, from the selected intervals;
      perform a face detection on at least one skin tone area in at least some of the candidate limited ranges; and
      select a chosen candidate limited range based on numbers of faces detected during said face detection, wherein the chosen candidate limited range has the maximum number of detected faces among the candidate limited ranges.

14. The device of claim 13 wherein the skin tone detector is further configured to scan the intervals along one axis of the predetermined colour space.

15. The device of claim 13 wherein if there are at least two candidate limited ranges having a same maximum number of detected faces among the skin tone areas, the facial feature detector is further configured to select the chosen candidate limited range having a lowest number of detected skin picture elements the image.

16. The device of claim 13 wherein, if at least two faces have been detected in at least two discontinuous intervals and at different spatial coordinates in two detected skin tone areas, the facial feature detector is further configured to choose the candidate limited range and to perform the face detection in the chosen candidate limited range independently for each of the two detected skin tone areas.

17. A portable electronic apparatus comprising a device for defining a skin tone in an image for face detection, the image comprising a plurality of picture elements, and each picture element having a plurality of colour components in a predetermined colour space, the device comprising:
  a skin tone detector configured to:
    determine an extended range of colour component values, in the colour space, in which a skin tone area is likely to be detected;
    define a plurality of intervals of colour component values, in the colour space, covering at least part of the extended range;
    scan at least some of the plurality of intervals to detect a skin tone area; and,
  a facial feature detector configured to:
    if at least one skin tone area is detected in at least one interval:
      select at least some of the intervals in which at least one skin tone area is detected;
      define candidate limited ranges of colour component values in the colour space, from the selected intervals;
      perform a face detection on at least one skin tone area in at least some of the candidate limited ranges; and
      select a chosen candidate limited range based on numbers of faces detected during said face detection, wherein the chosen candidate limited range has the maximum number of detected faces among the candidate limited ranges.

* * * * *